US008729841B2

(12) United States Patent
Reynolds et al.

(10) Patent No.: US 8,729,841 B2
(45) Date of Patent: May 20, 2014

(54) ELECTRONIC CIRCUIT AND METHOD GENERATING ELECTRIC MOTOR DRIVE SIGNALS HAVING PHASE ADVANCES IN ACCORDANCE WITH A USER SELECTED RELATIONSHIP BETWEEN ROTATIONAL SPEED OF AN ELECTRIC MOTOR AND THE PHASE ADVANCES

(75) Inventors: Timothy Reynolds, Westboro, MA (US); Chee-Kiong Ng, Acton, MA (US)

(73) Assignee: Allegro Microsystems, LLC, Worcester, MA (US)

( * ) Notice: Subject to any disclaimer, the term of this patent is extended or adjusted under 35 U.S.C. 154(b) by 201 days.

(21) Appl. No.: 13/271,723

(22) Filed: Oct. 12, 2011

(65) Prior Publication Data

US 2013/0009578 A1  Jan. 10, 2013

Related U.S. Application Data (60) Provisional application No. 61/505,645, filed on Jul. 8, 2011.

(51) Int. Cl.
   *H02P 6/14* (2006.01)
(52) U.S. Cl.
   CPC ........................................ *H02P 6/142* (2013.01)
   USPC ............ 318/400.14; 318/400.29; 318/400.11; 318/400.09
(58) Field of Classification Search
   CPC ........................................................ H02P 6/142
   USPC .............. 318/400.14, 400.09, 400.11, 400.29
   See application file for complete search history.

(56) References Cited

U.S. PATENT DOCUMENTS

| 4,510,423 | A | * | 4/1985 | Iwasawa ........................ 388/821 |
| 4,849,871 | A | * | 7/1989 | Wallingford .................... 363/41 |
| 5,204,601 | A | * | 4/1993 | Hirata et al. ................... 318/606 |
| 5,391,969 | A | * | 2/1995 | Tabuchi ......................... 318/611 |
| 6,023,417 | A | * | 2/2000 | Hava et al. ...................... 363/41 |
| 6,046,561 | A |   | 4/2000 | Zup et al. |
| 7,590,334 | B2 |  | 9/2009 | Yabusaki et al. |
| 7,747,146 | B2 |  | 6/2010 | Milano et al. |

FOREIGN PATENT DOCUMENTS

| EP | 1 557 940 A2 | 7/2005 |
| EP | 1 557 940 A3 | 7/2005 |
| FR | 2 532 490 | 3/1984 |
| GB | 2 388 090 A | 11/2003 |

OTHER PUBLICATIONS

Toshiba Preliminary Data Sheet TB9060FN; "Toshiba CMOS Digital Integrated Circuit, Silicon Monolithic;" www.datasheetcatalog.com; Sep. 11, 2002; 21 sheets.

PCT Search Report and Written Opinion of the ISA; dated Sep. 24, 2013; for PCT Pat. App. No. PCT/US2012/043271; 10 pages.

PCT International Preliminary Report on Patentability and Written Opinion of the ISA dated Jan. 23, 2014; for PCT Pat. App. No. PCT/US2012/043271; 7 pages.

* cited by examiner

*Primary Examiner* — Bentsu Ro
*Assistant Examiner* — David Luo
(74) *Attorney, Agent, or Firm* — Daly, Crowley, Mofford & Durkee, LLP (57) ABSTRACT

An electronic circuit and an associated method used to drive an electric motor provide a user selectable relationship between rotational speed of the electric motor and phase advances of signals used to drive the electric motor. By selecting the relationship, efficiency of the electric motor drive can be improved.

22 Claims, 4 Drawing Sheets

MODE 0

| FG (HZ) | PHA CODE |
|---|---|
| 0-49 | 0 |
| 50-99 | 0 |
| 100-149 | 0 |
| 150-199 | 0 |
| 200-249 | 0 |
| 250-299 | 0 |
| 300-349 | 0 |
| 350-399 | 0 |
| 400-449 | 0 |
| 450-GREATER | 0 |

*FIG. 6*

MODE 2

| FG (HZ) | PHA CODE |
|---|---|
| 0-49 | 0 |
| 50-99 | 1 |
| 100-149 | 2 |
| 150-199 | 3 |
| 200-249 | 4 |
| 250-299 | 5 |
| 300-349 | 6 |
| 350-399 | 7 |
| 400-449 | 8 |
| 450-499 | 9 |
| 500-549 | 10 |
| 550-GREATER | 11 |

*FIG. 5*

MODE 1

| FG (HZ) | PHA CODE |
|---|---|
| 0-24 | 0 |
| 25-49 | 3 |
| 50-74 | 4 |
| 75-99 | 5 |
| 100-124 | 6 |
| 125-149 | 7 |
| 150-174 | 8 |
| 175-199 | 9 |
| 200-224 | 10 |
| 225-GREATER | 11 |

*FIG. 4*

ELECTRONIC CIRCUIT AND METHOD GENERATING ELECTRIC MOTOR DRIVE SIGNALS HAVING PHASE ADVANCES IN ACCORDANCE WITH A USER SELECTED RELATIONSHIP BETWEEN ROTATIONAL SPEED OF AN ELECTRIC MOTOR AND THE PHASE ADVANCES

CROSS REFERENCE TO RELATED APPLICATIONS

This application claims the benefit under 35 U.S.C. §119 (e) of U.S. Provisional Application No. 61/505,645, filed on Jul. 8, 2011, which application is hereby incorporated herein by reference in its entirety.

STATEMENT REGARDING FEDERALLY SPONSORED RESEARCH

Not Applicable.

FIELD OF THE INVENTION

This invention relates generally to electric motor control circuits and, more particularly, to an electric motor control circuit that can provide a user selectable relationship between rotational speed of an electric motor and phase advance of drive signals that drive the electric motor to improve efficiency of the drive of the electric motor.

BACKGROUND OF THE INVENTION

Circuits to control and drive brushless DC (BLDC) electric motors are known. In some arrangements, the circuits provide a phase advance of drive signals that drive the electric motor, the phase advance related to rotational speed of the electric motor. However, such circuits are only able to provide one relationship between phase advances and rotational speeds.

Some known electric motor drive circuits are described in U.S. Pat. No. 7,590,334, issued Sep. 15, 2009, and U.S. Pat. No. 7,747,146, issued Jun. 29, 2010, both of which are assigned to the assignee of the present invention.

A BLDC electric motor can exhibit different efficiency behaviors versus speed when used in different applications. For example, the same BLDC electric motor can be used with different fan blade arrangements in different applications. Different types of BLDC electric motors can also exhibit different efficiency behaviors versus speed.

In view of the above, it would be desirable to provide an electric motor control circuit and associated method that can generate electric motor drive signals having phase advances determined in accordance with a user selectable relationship between rotational speeds and the phase advances, selected from among a plurality of different relationships.

SUMMARY OF THE INVENTION

The present invention provides an electric motor control circuit and associated method that can generate electric motor drive signals having phase advances determined in accordance with a user selectable relationship between rotational speeds and the phase advances, the relationship selected from among a plurality of different relationships. The relationships are retained on the circuit. With these arrangements, a user can choose the relationship to improve an efficiency of the electric motor drive.

In accordance with one aspect of the present invention, an electronic circuit for controlling an electric motor includes a speed sensing circuit coupled to the electric motor and configured to generate a speed signal representative of a rotational speed of the electric motor. The electronic circuit also includes a retention device configured to retain a plurality of relationships between rotational speeds of the electric motor and phase advances of electric motor drive signals that drive the electric motor. The electronic circuit also includes a phase advance selection input pin configured to receive a phase advance selection signal from outside of the electronic circuit. The phase advance selection signal is representative of a selected one of the plurality of relationships. The electronic circuit is configured to generate the electric motor drive signals having respective phase advances in response to the selected one of the plurality of relationships in combination with the speed signal.

In accordance with another aspect of the present invention, a method of controlling an electric motor includes generating a speed signal representative of a rotational speed of the electric motor. The method also includes retaining in a retention device a plurality of relationships between rotational speeds of the electric motor and phase advances of electric motor drive signals that drive the electric motor. The method also includes receiving a phase advance selection signal. The phase advance selection signal is representative of a selected one of the plurality of relationships. The method also includes generating the electric motor drive signals in response to the selected one of the plurality of relationships in combination with the speed signal.

BRIEF DESCRIPTION OF THE DRAWINGS

The foregoing features of the invention, as well as the invention itself may be more fully understood from the following detailed description of the drawings, in which.

DETAILED DESCRIPTION OF THE INVENTION

Before describing the present invention, some introductory concepts and terminology are explained. As used herein, the term "magnetic field sensing element" is used to describe a variety of electronic elements that can sense a magnetic field. The magnetic field sensing elements can be, but are not limited to, Hall effect elements, magnetoresistance elements, or magnetotransistors. As is known, there are different types of Hall effect elements, for example, a planar Hall element, a vertical Hall element, and a circular Hall element. As is also known, there are different types of magnetoresistance elements, for example, a giant magnetoresistance (GMR) element, an anisotropic magnetoresistance element (AMR), a tunneling magnetoresistance (TMR) element, an Indium antimonide (InSb) sensor, and a magnetic tunnel junction (MTJ).

As is known, some of the above-described magnetic field sensing elements tend to have an axis of maximum sensitivity parallel to a substrate that supports the magnetic field sensing element, and others of the above-described magnetic field sensing elements tend to have an axis of maximum sensitivity perpendicular to a substrate that supports the magnetic field sensing element. In particular, most types of magnetoresistance elements tend to have axes of maximum sensitivity parallel to the substrate and most types of Hall elements tend to have axes of sensitivity perpendicular to a substrate.

As used herein, the term "magnetic field sensor" is used to describe a circuit that includes a magnetic field sensing element. Magnetic field sensors are used in a variety of applications, including, but not limited to, a current sensor that senses a magnetic field generated by a current carried by a current-carrying conductor, a magnetic switch that senses the proximity of a ferromagnetic object, a rotation detector that senses passing ferromagnetic articles, for example, magnetic domains of a ring magnet, and a magnetic field sensor that senses a magnetic field density of a magnetic field.

Figure 1:
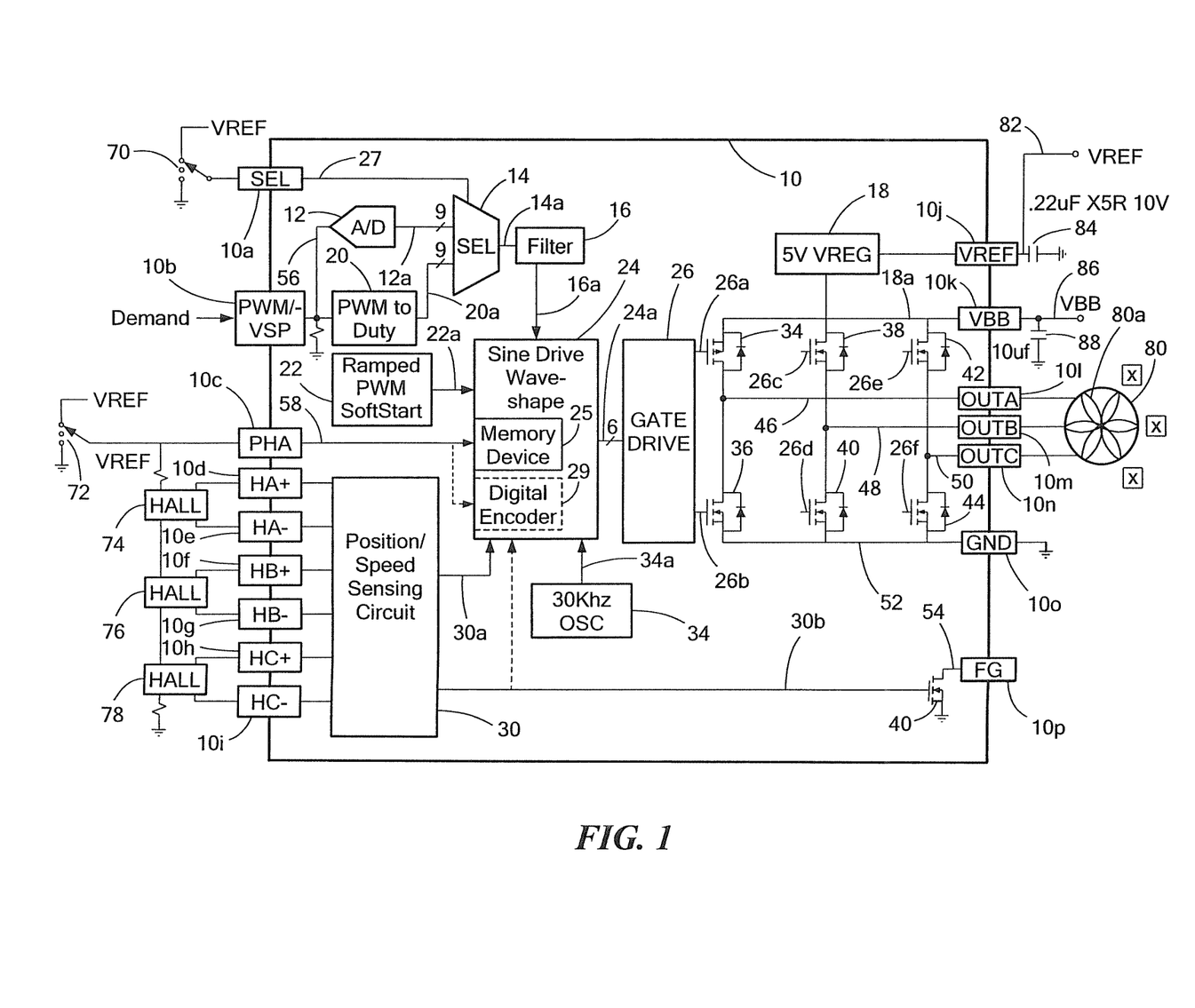
FIG. 1 is a block diagram of a circuit used to control an electric motor, wherein the circuit is coupled to a switch that can select from a plurality of different relationships between rotational speeds of the electric motor and phases of drive signals that drive the electric motor, wherein the plurality of relationships are retained in the circuit.

Referring to FIG. 1, an exemplary electronic circuit 10 has a plurality of pins 10a-10p with respective functions and couplings described below.

Pin 10b, a pulse width modulation/voltage selection pin (PWM/VSP), is coupled to receive a demand signal 56. The demand signal 56 can be one of a variety of different types of signals. For example, the demand signal 56 can be a voltage signal having a selected voltage value indicative of a desired speed of an electric motor 80. The demand signal 56 can also be, for example, a pulse width modulated (PWM) signal having a selected duty cycle indicative of the desired speed of the electric motor 80. The type of signal received by the pin 10b can be selected by a signal applied to a select pin 10a.

The demand signal 56 is a speed demand signal that can request (i.e., demand) a relative speed (e.g., from zero to one hundred percent) of the electric motor 80. It will become apparent from discussion below that the relative speed of the electric motor can be controlled by way of a selection of a maximum duty cycle of a PWM waveform that drives the electric motor 80. The PWM drive signals that drive the electric motor 80 are not to be confused with the demand signal 56, which can be a PWM signal with a duty cycle selected to indicate a desired relative electric motor speed. It should be understood that the demand signal requests a relative speed, however, the absolute speed of the motor is determined by a variety factors, including, but not limited to, a type of motor and a load imposed upon the motor.

In some particular embodiments in which the demand signal 56 is a PWM signal, a duty cycle of the demand signal 56 between about twenty-five percent and about one hundred percent is approximately linearly related to a resulting maximum duty cycle of PWM signals that drive the electric motor 80 (FIG. 1), which are also between about twenty-five percent and about one hundred percent, respectively. In some embodiments, a PWM demand signal 56 with a duty cycle of less than about twenty-five percent results in the electric motor 80 receiving no drive and the electric motor 80 coasts to a stop.

Similarly, in some particular embodiments in which the demand signal 56 is a voltage signal having voltage values, voltage values from about one volt to about 4.3 volts are approximately linearly related to a resulting maximum duty cycle of PWM signals that drive the electric motor 80 (FIG. 1), which are from about twenty-five percent to about one hundred percent, respectively. In some embodiments, a voltage value of the demand signal 56 less than about one volt results in the electric motor 80 receiving no drive and the electric motor 80 coasts to a stop.

Pin 10a, a select pin, is coupled to receive a selection signal 27. The selection signal 27 instructs the circuit 10 which type of demand signal 56 is being used. The select pin 10a can be coupled to receive the selection signal 27 from a switch 70, for example, a single pole double throw switch, in which case there are two selections. However, in other embodiments, there can be more than two selections. In still other embodiments, the selection signal 27 can be generated by other circuits (not shown) rather than by the switch 70.

Pin 10c, a phase advance (PHA) selection input pin, is configured to receive a phase advance selection signal 58 from outside of the electronic circuit 10. The phase advance selection signal 58 is indicative of a selected one of a plurality of relationships between rotational speeds of an electric motor 80 and phase advances of electric motor drive signals 10l, 10m, 10n that drive the electric motor 80. The relationships are stored (i.e., retained) in a memory device 25 (or retained in a digital encoder 29). Exemplary relationships are described more fully below in conjunction with FIGS. 4, 5, and 6. The electronic circuit 10 is configured to generate the electric motor drive signals 10l, 10m, 10n having respective phase advances in response to the selected one of the plurality of relationships and in response to a detected rotational speed of the electric motor 80. The electric motor drive signals 10l, 10m, 10n are described more fully below in conjunction with FIGS. 2 and 3.

The electric motor 80 and the fan blades 80a can be used, for example, in a household appliance, for example, in a refrigerator. As described above, the same electric motor can be used in a variety of applications, for example, in different household appliances, each having a different fan 80a. Each application can benefit from using a different relationship between electric motor speeds and phase advances. Thus, for any application, an end user of the circuit 10 can select the relationship by way of a switch 72.

The phase advance selection input pin 10b can be coupled to receive the phase advance selection signal 58 from the switch 72. The switch 72 can be a single pole triple throw switch, in which case there are three selections. However, in other embodiments, there can be more than three or fewer than three selections, but at least two selections. In still other embodiments, the phase advance selection signal 58 can be generated by other circuits (not shown) rather than by the switch 72.

Pins 10d-10i, Hall element coupling pins, are coupled to receive signals from magnetic field sensing elements, for example, from Hall elements 74, 76, 78. The Hall elements 74, 76, 78 are disposed in close proximity to the electric motor 80 and at positions that enable the Hall elements 74, 76, 78 to sense passing magnets within the electric motor 80. In one particular embodiment, the Hall elements 74, 76, 78 are positioned relative to each other so as to provide output signals from the Hall elements 74, 76, 78 that are one hundred twenty degrees apart from each other.

It will be appreciated that the electric motor 80 can include a plurality of magnets. For these arrangements, it should be appreciated that a full cycle of the signal generated by each one of Hall elements 74, 76, 78 is achieved upon one of the plurality of magnets passing by a respective one of the Hall elements 74, 76, 78. Thus, each one of the Hall elements 74, 76, 78 can generate a respective signal having a plurality of full cycles for each rotation of the electric motor 80.

Pin 10*l*, a voltage reference (VREF) pin, provides a reference voltage output 82. A capacitor 84 can be coupled between pin 10*l* and ground.

Pin 10*k*, a VBB power supply pin, is coupled to receive a power supply voltage signal 86. A capacitor 88 can be coupled between pin 10*k* and ground.

Pins 10*l*, 10*m*, 10*n*, output pins (OUTA, OUTB, and OUTC), are coupled to provide drive signals 46, 48, 50 to cause fan blades 80*a* coupled to the electric motor 80 to rotate.

Pin 10*o*, a ground pin, is coupled to ground.

Pin 10*p*, a frequency generator (FG) pin, is configured to generate a signal 54 having a frequency representative of an absolute speed of rotation of the electric motor 80.

The demand signal 56 can be received from other circuits (not shown) and the FG signal 54 can be provided to other circuits (not shown).

The circuit 10 can include a PWM to duty cycle converter 20 coupled to the PWM/VSP selection pin 10*a* and configured to generate a control signal 20*a*. The circuit 10 can also include an analog-to-digital converter 12 coupled to the PWM/VSP selection pin 10*a* and configured to generate a control signal 12*a*. The selection signal 27, by way of the switch 70, selects one of the two control signals 12*a*, 20*a*. The two control signals 12*a*, 20*a* can, for example, be nine-bit digital signals, each representative of a demand for relative speed (e.g., zero to one hundred percent) of the electric motor 80, which can ultimately set a maximum duty cycle of a PWM drive signal to the electric motor 80. The selection is made between the two control signals 12*a*, 20*a*, according to what type of demand signal 56 is applied to the circuit 10. For example, if the demand signal is a voltage signal having a voltage value, then the control signal 12*a* is selected by way of the switch 70 and by way of a selection multiplexer 14. For another example, if the demand signal 56 is a PWM signal, then the control signal 20*a* is selected by way of the switch 70 and by way of the selection multiplexer 14.

The selection multiplexer 14 is configured to provide a control signal 14*a* as a selected one of the control signal 12*a* and the control signal 20*a*.

A filter 16 can be coupled to receive the control signal 14*a*. The filter 16 can be, for example, a digital filter configured to remove noise, for example, noise due to external sources.

The filter 16 is configured to generate a filtered signal 16*a* representative of a maximum PWM duty cycle that is ultimately applied to the electric motor 80.

The circuit 10 can also include a sine drive waveshape circuit 24 coupled to receive the control signal 16*a* and configured to generate an output signal 24*a*. Operation of the sine drive waveshape circuit 24 is described more fully below. However, let it suffice here to say that the signal 24*a* can be a digital signal that ultimately results in a variable duty cycle PWM signal applied as signals 46, 48, 50 to the electric motor 80.

The output signal 24*a* is received by a gate drive circuit 26. The gate drive circuit 26 is configured to generate gate drive signals 26*a*, 26*b*, 26*c*, 26*c*, 26*e*, 26*f* to drive him FETs 34, 36, 38, 40, 42, 44, respectively. The FETs 34, 36, 38, 40, 42, 44 generate the variable duty cycle PWM signals 46, 48, 50 that cause the electric motor 80 to rotate. The signals 46, 48, 50 are described more fully below in conjunction with FIGS. 2 and 3.

The sine drive waveshape circuit 24 can include a memory device 25 or can otherwise be coupled to a memory device, configured to retain (i.e., store) the above-described plurality of relationships between rotational speeds of the electric motor 80 and the phase advances of electric motor drive signals 10*l*, 10*m*, 10*n* that drive the electric motor 80. The signal 58 can select one relationship from among the plurality of stored relationships.

In some embodiments, the sine drive waveshape circuit 24 can optionally include or can otherwise optionally be coupled to a digital encoder 29 configured to retain the above-described plurality of relationships between rotational speeds of the electric motor 80 and the phase advances of electric motor drive signals 10*l*, 10*m*, 10*n* that drive the electric motor 80. The signal 58 can select one relationship from among the plurality of retained relationships.

As used herein, the term "retention device" is used to refer either to the memory device 25 or to the digital encoder 29, or both. It will be understood that the digital encoder 29 can retain the relationships in an encoding structure within the digital encoder 29. It will also be understood that a memory device can retain (i.e., store) the relationships, for example, as look-up tables or as algorithms.

Sine drive waveshape circuits like the sine drive waveshape circuit 24 are known, but without the memory device 25 and without the digital encoder 29 that provide functions described more fully below.

The circuit 10 can also include a position/speed sensing circuit 30 coupled to receive differential signals from the three Hall elements 74, 76, 78. The position/speed sensing circuit 30 is configured to generate signals 30*a*, which, in some embodiments, can be three separate signals represented by the one arrow, each signal related to a signal from a respective one of the Hall elements. The sine drive waveshape circuit 24 can be coupled to receive the signals 30*a*. The separate signals 30*a* are described more fully below in conjunction with FIG. 2. However, let is suffice here to say that the signals 30*a* can be three square wave signals generated by comparing sinusoidal signals generated by the Hall elements 74, 76, 78 with a threshold value.

While Hall elements 74, 76, 78 are shown, in other embodiments, other types of magnetic field sensing elements can be used.

In other embodiments, the signal 30*a* can be one signal, for example, a serial or parallel digital signal that can represent information within separate square wave signals shown below in conjunction with FIG. 2.

The signal(s) 30*a* can be representative of rotational position and/or speed of rotation of the electric motor 80.

The position/speed sensing circuit 30 can also be configured to generate a speed signal 30*b* representative of a speed of rotation of the electric motor 80. In some embodiments, the speed signal 30*b* is also coupled to the sine drive waveshape circuit 24 and is used by the sine drive waveshape circuit 24 to represent the speed of rotation of the electric motor 80 instead of the signal(s) 30*a*. However, the signals(s) 30*a* are still used by the sine drive waveshape circuit 24 to represent position of the electric motor 80.

It will be appreciated that the signal(s) 30*a* have frequencies related to a speed of rotation of the electric motor 80. It will also be appreciated that, due to positions of the Hall elements 74, 76, 78 within the electric motor 80, the signals 30*a* have phases and relative phase relationships indicative of a rotational position of the electric motor 80.

The sine drive waveshape circuit 24 is configured to use the selected relationship between rotational speeds of the electric motor 80 and the phase advances of electric motor drive signals 10*l*, 10*m*, 10*n* that drive the electric motor 80, selected from the memory device 25 (or optionally from the digital encoder 29) in accordance with the selection signal 58. The sine drive waveshape circuit 24 is also configured to use speed information (e.g., frequency) within the signals 30*a* (or optionally, within the signal 30*b*) to identify a phase advance from within the selected relationship. Using the identified phase advance, the sine drive waveshape circuit 24 generates PWM signals having the phase advance. The PWM signals are described more fully below in conjunction with FIG. 3. It will be seen that the PWM signals have duty cycles that vary in accordance with sinusoid signals described more fully below in conjunction with FIG. 2, ultimately resulting in the variable duty cycle PWM signals 46, 48, 50 applied to the electric motor 80. Each one of the signals 46, 48, 50 has a respective phase advance, which can be the same phase advance, in accordance with the selected relationship, and in accordance with the detected speed of rotation of the electric motor 80.

The circuit 10 can also include an oscillator 34, for example, a thirty kilohertz oscillator, configured to generate a clock signal 34*a* that determines a frequency of the PWM signal generated by the sine drive waveshape circuit 24.

A FET 40 can be externally coupled in a common drain configuration using an external resistor to generate the frequency generation (FG), speed of rotation, signal 54. It will be understood that the frequency of the signal 54 can be related to the rotational speed of the electric motor 80. The FG signal 54 can be used by other circuits (not shown).

It will be understood that the electric motor 80 being driven by the three drive signals 46, 48, 50 is representative of a three-phase electric motor 80. In other words the electric motor 80 has three windings, which can be driven at respective ends. The three windings can be coupled together at respective other ends in a star-type configuration. While a three-phase electric motor 80 is shown, the same techniques apply to an electric motor having more than or fewer than three phases, and a corresponding more than or fewer than three drive signals.

The electronic circuit 10 can also include a ramped PWM soft start circuit 22 configured to generate a soft start signal 22*a*. The soft start signal 22*a* can cause the sine drive waveshape circuit 24 to apply drive signals to the electric motor 80 that ramp up to the desired maximum PWM duty cycle. This arrangement avoids high start-up currents as the electric motor 80 comes up to speed.

Figure 2:
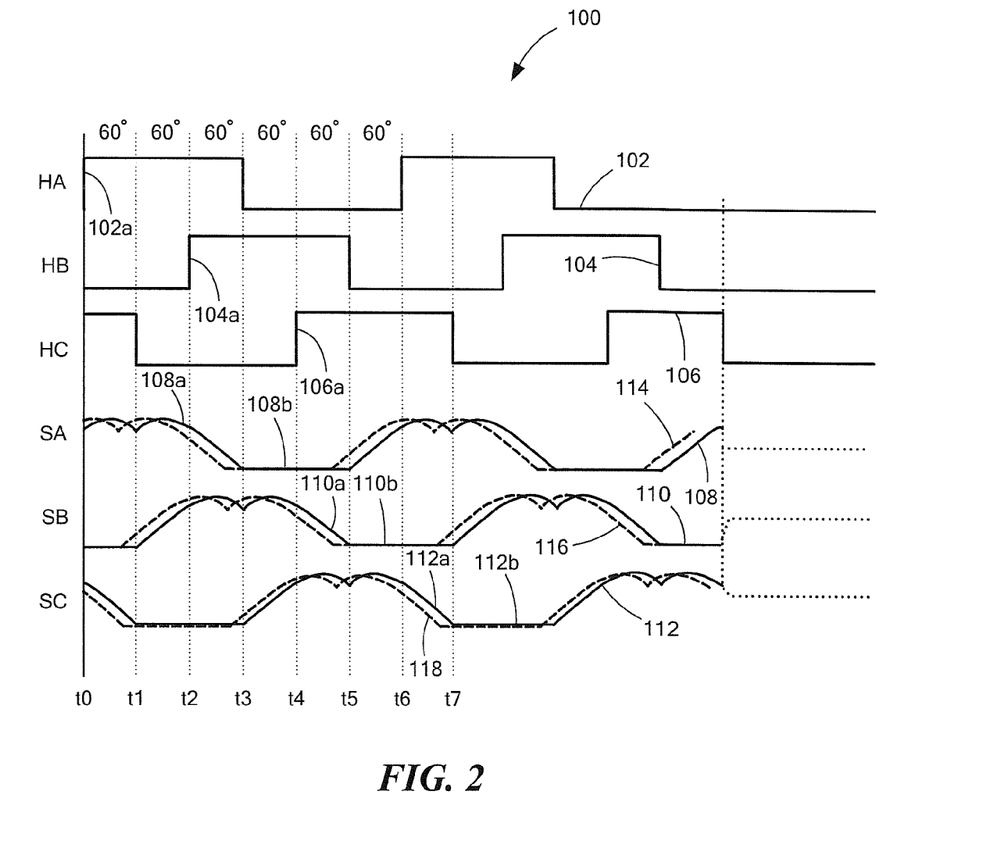
FIG. 2 is a graph showing exemplary signals within the circuit of FIG. 1.

Referring now to FIG. 2, a graph 100 has a horizontal axis with a scale in units of time in arbitrary units. The graph 100 also has a vertical axis with a scale in arbitrary units. A plurality of signals is shown in the graph 100, and each signal has a separate vertical scale.

Signals 102, 104, 106 are representative of the signals 30*a* of FIG. 1. The signals 102, 104, 106 are generated by using comparators upon signals generated by the three Hall elements 74, 76, 78 of FIG. 1, resulting in three square wave signals. As described above in conjunction with FIG. 1, the three Hall elements 74, 76, 78 are physically positioned within the electric motor 80 so that the three signals 102, 104, 108 are one hundred twenty degrees apart relative to each other as the electric motor 80 rotates. There can be one or more cycles of each one of the signals 102, 104, 106 upon each rotation of the electric motor 80

A signal 108 corresponds to an analog sinusoid generated by and internal to the sine drive waveshape circuit 24 of FIG. 1. The signal 108 need not be output from the sine drive waveshape circuit 24. Instead, as described more fully in conjunction with FIG. 3, the signal 108 is used to generate a PWM signal having a duty cycle that varies according to analog values of the signal 108.

The signal 108 has peaks, for example, a peak 108*a*, and low or zero regions, for example a low or zero region 108*b*. In some embodiments, depending on a selection by way of a value of the demand signal 56 of FIG. 1, at the peaks of the signal 108, a resulting PWM signal will have a one hundred percent duty cycle, i.e., a state of the PWM signal will be fully on and the PWM signal will stop switching. In some embodiments, at low or zero regions of the signal 108, a resulting PWM signal will have a zero percent duty cycle, i.e. a state of the PWM signal will be fully off in the PWM signal will stop switching.

For other values of the demand signal 56, the resulting PWM signal can have a duty cycle less than one hundred percent in association with the peaks of the signal 108. The resulting PWM signal is described more fully below in conjunction with FIG. 3

Signals 110, 112 also correspond to an analog sinusoids generated by and internal to the sine drive waveshape circuit 24 of FIG. 1.

Versions 114, 116, 118 of the signals 108, 110, 112 are the same as the signals 108, 110, 112, respectively, but are advanced in phase. As will be understood from discussion in conjunction with FIGS. 4, 5, and 6 below, the amount of the phase advance is determined by using a user-selected relationship between possible rotational speeds of the electric motor 80 and phase advances in combination with a detected absolute speed of rotation of the electric motor 80, detected by the position/speed sensing circuit 30 of FIG. 1.

In some embodiments the phase advances applied to each one of the signals 108, 110, 112 are the same phase advance. However, in other embodiments the phase advances are not the same.

It should be understood that the three signals 108, 110, 112 have phases corresponding to phases of the signals 102, 104, 106, respectively. In particular, the signal 108 achieves a lowest value at a time t3 coincident with a falling edge of the signal 102. Similarly, the signal 110 achieves a lowest value at a time t5 coincident with a falling edge of the signal 104 and the signal 112 achieves a lowest value at a time t7 coincident with a falling edge of the signal 106. Thus, the signal 108, 110, 112 have phases one hundred twenty degrees apart like the signals 102, 104, 106. Phase advances described herein are relative phase advances, relative to positions of the signals 108, 110, 112, which have zero phase advances relative to the signals 102, 104, 106, respectively.

The signals 108, 110, 112 could be applied as analog signals to drive the electric motor 80. However, in order to derive more efficiency, PWM signals described more fully below can instead be used to drive the electric motor 80. PWM signals described below are related to the signals 108, 110, 112, or to the phase advanced signal 114, 116, 118 when phase advances are applied.

While the signals 108, 110, 112 show particular sinusoidal shapes particularly suitable for driving a three phase electric motor, in other embodiments, other signals corresponding to the signals 108, 110, 112, but having other sinusoidal shapes, can be used. Also, in still other embodiments, square wave shaped signals corresponding to the signals 108, 110, 112 can be used.

Figure 3:
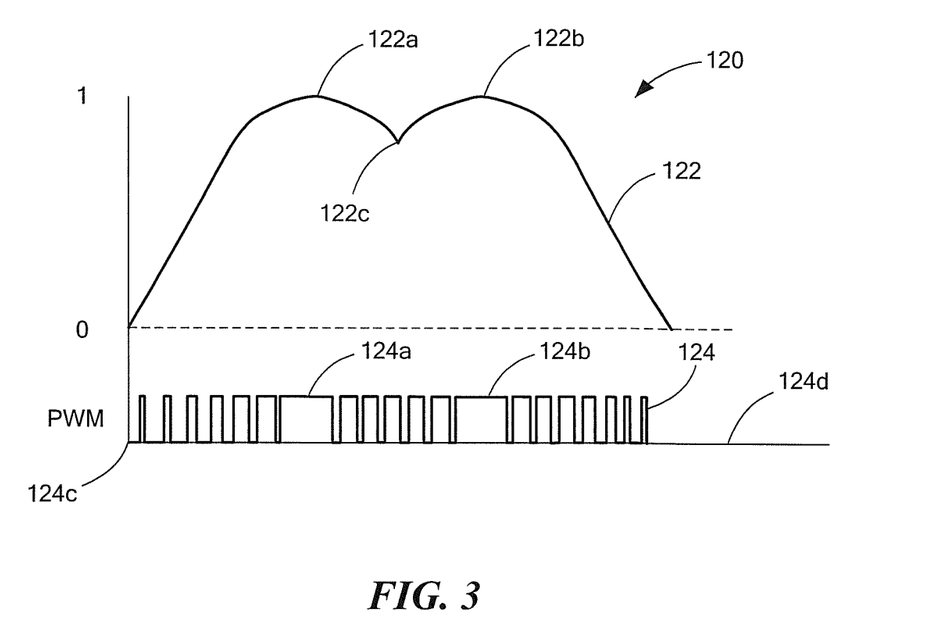
FIG. 3 is another graph showing exemplary signals within the circuit of FIG. 1.

Referring now to FIG. 3, a graph 120 has a horizontal axis with a scale in units of time in arbitrary units and a vertical axis with a scale in arbitrary units. A signal 122 is like a portion of the signal 108 of FIG. 2, here shown in expanded form for clarity.

The signal 122 has two peaks 122a, 122b and a central valley 122c.

A PWM signal 124 is shown in time synchronization with the signal 122. The PWM signal 124 has regions, e.g., regions 124a, 124b, with a highest duty cycle (here one hundred percent) coincident with the peaks 122a, 122b of the signal 122. The signal 124 also has regions, e.g., regions 124c, 124d, with a lowest duty cycle (here zero percent) coincident with zero values of the signal 122. Thus it will be appreciated that the PWM signal 124 has a duty cycle at any time that is related to an analog value of the signal 122 at that same time.

While the PWM signal 124 is shown to achieve a one hundred percent duty cycle coincident with the peaks 122a, 122b, other highest duty cycles are also possible, and the highest duty cycle can be selected by way of the speed demand signal 56 of FIG. 1. Thus, the PWM signal 124, having one hundred percent duty cycle at the peaks of the signal 122, is representative of the demand signal 56 of FIG. 1 having a highest demand signal value (e.g., one or one hundred percent). If the demand signal 56 has a lower value, then the maximum duty cycle of the PWM signal 124 at the peaks of the signal 122 will be less than one hundred percent.

In accordance with the PWM signal 124, and referring briefly again to signals 108, 110, 112 of FIG. 2 (or the phase advanced signals 114, 116, 118), three similar PWM signals like the PWM signal 124, but each at a different phase, can be used to drive the electric motor 80 of FIG. 1. Each one of the three PWM signals can have a respective duty cycle that varies in time according to values of a respective one of the signals 108, 110, 112 of FIG. 2 (or according to values of a respective one of the phase advanced signals 114, 116, 118). Each one of the three PWM signals that drive the electric motor 80 (FIG. 1) can be phase advanced in a way described in conjunction with the signals 114, 116, 118 of FIG. 2.

Using the PWM signals 46, 48, 50 generated by the FETS 34, 36, 38, 40, 42, 44 of FIG. 1 rather than analog drive signals results in higher efficiency, since the FETS are operated in saturation and thus have low voltage drops.

In accordance with one of three possible selections made by the switch 72 of FIG., the phase advances provided to the PWM signals 46, 48, 50 of FIG. 1 can have a selected one of three different relationships with respect to measured rotational speeds of the electric motor 80. These relationships are referred to herein as mode 0, mode 1, and mode 2 relationships. In an exemplary mode 0 relationship selected by the switch 72, there is no phase advance applied to the signals 34, 36, 38, 40, 42, 44 at any rotational speed of the electric motor. It will be appreciated that this relationship is a simple algorithmic relationship.

Figure 4:
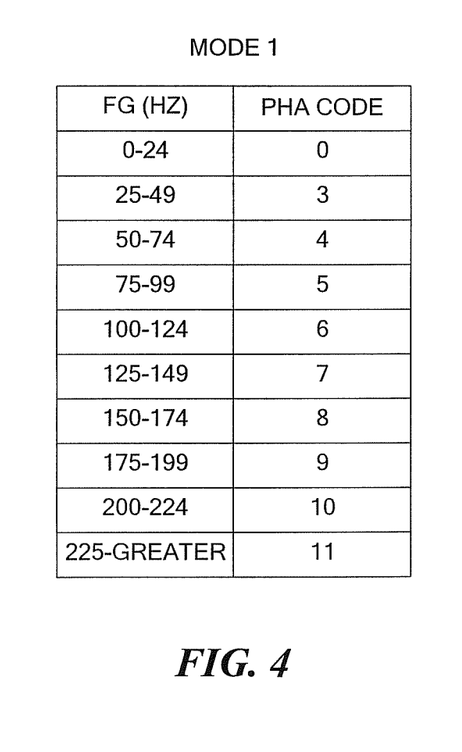
FIG. 4 is a table showing a relationship between measured rotational speeds of the electric motor of FIG. 1 versus phase advances of drive signals that drive the electric motor, wherein the relationship is embodied in a first look-up table stored within the memory device of FIG. 1.

Referring now to FIG. 4, an exemplary mode 1 relationship between rotational speed of the electric motor 80 (represented by the FG signal 54 of FIG. 1) and a phase advance (PHA) code is shown in an exemplary look up table. The look up table of FIG. 4 can be one of a plurality of look up tables stored in the memory device 25 of FIG. 1. The PHA code can be associated with a number of phase advance degrees. For example, in one particular embodiment, each unit of the PHA code can correspond to a phase advance of about 1.88 degrees. However, other phase advances per code are also possible.

Hysteresis between ranges of FG values can be used to avoid switching undesirably between the ranges and PHA codes. Alternatively or in combination, a digital filter can be applied to an internal digital representation of measured speed of the electric motor 80.

While specific ranges of FG values (motor speeds) and specific PHA codes are shown, it should be appreciated that other ranges of FG values and other PHA colds can be used in this table and in other tables descried below.

Figure 5:
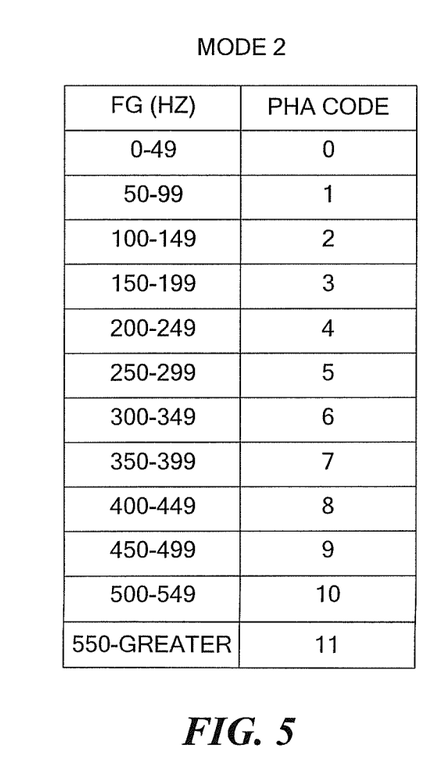
FIG. 5 is a table showing another different relationship between measured rotational speeds of the electric motor of FIG. 1 versus phase advances of drive signals that drive the electric motor, wherein the relationship is embodied in a second look-up table stored within the memory device of FIG. 1.

Referring now to FIG. 5, an exemplary mode 2 relationship between rotational speed of the electric motor 80 and a phase advance (PHA) code is shown in another exemplary look up table. The look up table of FIG. 5 can be one of a plurality of look up tables stored in the memory device 25 of FIG. 1. As described above in conjunction with FIG. 4, the PHA code can be associated with a number of phase advance degrees. For example, in one particular embodiment, each unit of the PHA code can correspond to a phase advance of about 1.88 degrees. Thus, it will be appreciated that the mode 2 look up table, when selected by the switch 72, applies a greater phase advance to the signals 46, 48, 50 at most rotational speeds of the electric motor 80 than the mode 1 look up table and than the mode 0 algorithm.

It should be appreciated that, while look up tables are shown and described in conjunction with FIGS. 4 and 5, in other embodiments, the relationships represented by FIGS. 4 and 5 can instead be stored in the memory device 25 as algorithmic relationships. In still other embodiments, the relationships represented by FIGS. 4 and 5 can instead be generated by the digital encoder 29 (FIG. 1), which can be coupled to receive the phase advance selection signal 58, coupled to receive speed values and configured to output the PHA codes. In still other embodiments, the PHA codes, which are intermediate values, are not used but are replaced by phase advance values directly indicative of the desired phase advances.

Also, while particular relationships are shown in FIGS. 4 and 5, any other relationships can be provided. Also, as described above, while three modes and three corresponding selections are made by the switch 72 of FIG. 1, in other embodiments, there can be more than or fewer than three modes, but at least two modes and two corresponding selections made by the switch.

Figure 6:
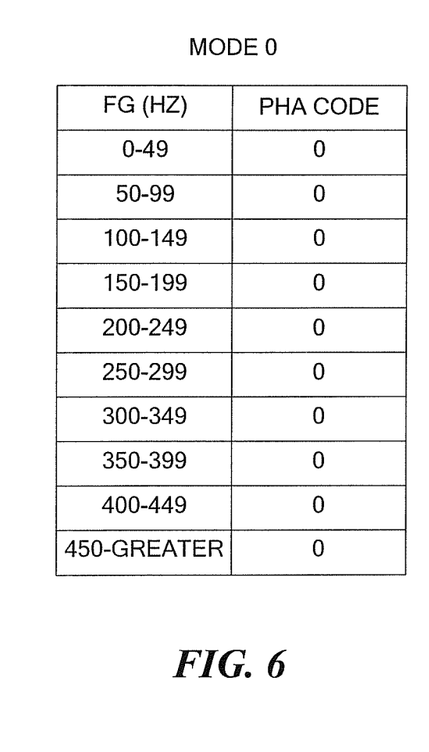
FIG. 6 is a table showing a another different relationship between measured rotational speeds of the electric motor of FIG. 1 versus phase advances of drive signals that drive the electric motor, wherein the relationship is embodied in a third look-up table stored within the memory device of FIG. 1.

Referring now to FIG. 6, the above-described mode 0 relationship is shown as a look up table rather than as an algorithmic relationship. Either the algorithmic relationship or the look up table of FIG. 6 can be stored in the memory device.

The user can select the relationship, e.g., stored look-up table, stored algorithm or retained encoding structure, to use in a particular application, for example, by measuring the power consumption of the electric motor (e.g., 80, FIG. 1) for each one of the available relationship selections selected by the switch 72 of FIG. 1. Then, the user can select the one of the relationships that achieves a lowest power consumption and set the switch 72 to that position for further operation.

All references cited herein are hereby incorporated herein by reference in their entirety.

Having described preferred embodiments, which serve to illustrate various concepts, structures and techniques, which are the subject of this patent, it will now become apparent to those of ordinary skill in the art that other embodiments incorporating these concepts, structures and techniques may be used. Accordingly, it is submitted that that scope of the patent should not be limited to the described embodiments but rather should be limited only by the spirit and scope of the following claims.

What is claimed is:

1. An electronic circuit for controlling an electric motor, comprising:

a speed sensing circuit coupled to the electric motor and configured to generate a speed signal representative of a rotational speed of the electric motor;

a retention device configured to retain, at the same time, a plurality of relationships between rotational speeds of the electric motor and phase advances of electric motor drive signals that drive the electric motor, wherein each one of the plurality of relationships relates a respective plurality of rotational speeds of the electric motor to an associated plurality of phase advances of the electric motor drive signals; and a phase advance selection input pin configured to receive a phase advance selection signal from outside of the electronic circuit, the phase advance selection signal operable to select one of the plurality of relationships, wherein the electronic circuit is configured to generate the electric motor drive signals having respective phase advances in response to the selected one of the plurality of relationships in combination with the speed signal.

2. The electronic circuit of claim 1, wherein the retention device comprises a memory device, and wherein two or more of the plurality of relationships are stored in the memory device as a respective two or more look-up tables relating the rotational speeds of the electric motor and the phase advances of the electric motor drive signals.

3. The electronic circuit of claim 1, wherein the retention device comprises a memory device, and wherein one or more of the plurality of relationships are stored in the memory device as a respective one or more algorithms relating the rotational speeds of the electric motor and the phase advances of the electric motor drive signals.

4. The electronic circuit of claim 1, wherein the retention device comprises a memory device, and wherein two or more of the plurality of relationships are stored in the memory device as a respective two or more algorithms relating the rotational speeds of the electric motor and the phase advances of the electric motor drive signals.

5. The electronic circuit of claim 1, wherein the retention device comprises a digital encoder, and wherein two or more of the plurality of relationships are retained in the digital encoder as a respective two or more encoding structures relating the rotational speeds of the electric motor and the phase advances of the electric motor drive signals.

6. The electronic circuit of claim 1, wherein the phase advance selection input pin is configured to receive the phase advance selection signal from a switch.

7. The electronic circuit of claim 6, wherein the switch has as least two positions to generate the phase advance selection signal having a respective at least two values or conditions, resulting in a selection of one of two of the plurality of relationships depending upon a selection position of the switch.

8. The electronic circuit of claim 6, wherein the switch has as least three positions to generate the phase advance selection signal having a respective at least three values or conditions, resulting in a selection of one of three of the plurality of relationships depending upon a selection position of the switch.

9. The electronic circuit of claim 1, wherein the electronic circuit is configured to generate three electric motor drive signals, each about one hundred twenty degrees apart from others of the electric motor drive signals, and wherein the phase advances of the drive signals operate upon all three of the drive signals to apply the phase advance to each of the three electric motor drive signals.

10. The electronic circuit of claim 1, wherein the electric motor drive signals comprise pulse width modulated signals having respective modulations that follow sinusoidal relationships.

11. The electronic circuit of claim 1, wherein the speed sensing circuit comprises a magnetic field sensing element disposed to sense rotation of the electric motor.

12. A method of controlling an electric motor with an electronic circuit, the method comprising:

generating a speed signal representative of a rotational speed of the electric motor, retaining in a retention device, at the same time, a plurality of relationships between rotational speeds of the electric motor and phase advances of electric motor drive signals that drive the electric motor, wherein each one of the plurality of relationships relates a respective plurality of rotational speeds of the electric motor to an associated plurality of phase advances of the electric motor drive signals;

receiving, from outside of the electronic circuit, a phase advance selection signal, the phase advance selection signal operable to select one of the plurality of relationships; and generating the electric motor drive signals having respective phase advances in response to the selected one of the plurality of relationships in combination with the speed signal.

13. The method of claim 12, wherein the retention device comprises a memory device, and wherein the retaining comprises storing two or more of the plurality of relationships in the memory device as a respective two or more look-up tables relating the rotational speeds of the electric motor and the phase advances of the electric motor drive signals.

14. The method of claim 12, wherein the retention device comprises a memory device, and wherein the retaining comprises storing one or more of the plurality of relationships in the memory device as a respective one or more algorithms relating the rotational speeds of the electric motor and the phase advances of the electric motor drive signals.

15. The method of claim 12, wherein the retention device comprises a memory device, and wherein the retaining comprises storing two or more of the plurality of relationships in the memory device as a respective two or more algorithms relating the rotational speeds of the electric motor and the phase advances of the electric motor drive signals.

16. The method of claim 12, wherein the retention device comprises a digital encoder, and wherein the retaining comprises retaining two or more of the plurality of relationships in the digital encoder as a respective two or more encoding structures relating the rotational speeds of the electric motor and the phase advances of the electric motor drive signals.

17. The method of claim 12, wherein the receiving the phase advance selection signal comprises receiving the phase advance selection signal from a switch.

18. The method of claim 17, wherein the switch has as least two positions to generate the phase advance selection signal having a respective at least two values or conditions, resulting in a selection of one of two of the plurality of relationships depending upon a selection position of the switch.

19. The method of claim 17, wherein the switch has as least three positions to generate the phase advance selection signal having a respective at least three values or conditions, resulting in a selection of one of three of the plurality of relationships depending upon a selection position of the switch.

20. The method of claim 12, further comprising:

generating three electric motor drive signals, each about one hundred twenty degrees apart from others of the electric motor drive signals, wherein the phase advances of the drive signals operate upon all three of the drive signals to apply the phase advance to each of the three electric motor drive signals.

21. The method of claim 12, wherein the electric motor drive signals comprise pulse width modulated signals having respective modulations that follow sinusoidal relationships.

22. The method of claim 12, wherein generating the speed signal comprises sensing the speed of the electric motor with a magnetic field sensing element.

* * * * *

UNITED STATES PATENT AND TRADEMARK OFFICE
CERTIFICATE OF CORRECTION

| | | |
|---|---|---|
| PATENT NO. | : 8,729,841 B2 | Page 1 of 1 |
| APPLICATION NO. | : 13/271723 | |
| DATED | : May 20, 2014 | |
| INVENTOR(S) | : Timothy Reynolds et al. | |

It is certified that error appears in the above-identified patent and that said Letters Patent is hereby corrected as shown below:

Specification

Column 2, line 58 delete "showing a another" and replace with --showing another--.

Column 5, line 65 delete "to drive him FETS" and replace with --to drive FETS--.

Column 6, line 40 delete ", let is" and replace with --, let it--.

Column 8, line 15 delete "in" and replace with --and--.

Column 8, line 23 delete "to an analog sinusoids" and replace with --to analog sinusoids--.

Column 8, line 46 delete "signal 108," and replace with --signals 108,--.

Column 8, line 57 delete "signal" and replace with --signals--.

Column 9, line 44 delete "of FIG.," and replace with --of FIG. 1,--.

Column 10, line 5 delete "colds" and replace with --codes--.

Column 10, line 60 delete "that that" and replace with --that the--.

Claims

Column 11, line 56 delete "as" and replace with --at--.

Signed and Sealed this
Twenty-seventh Day of October, 2015

Michelle K. Lee
*Director of the United States Patent and Trademark Office*